Figure 1:
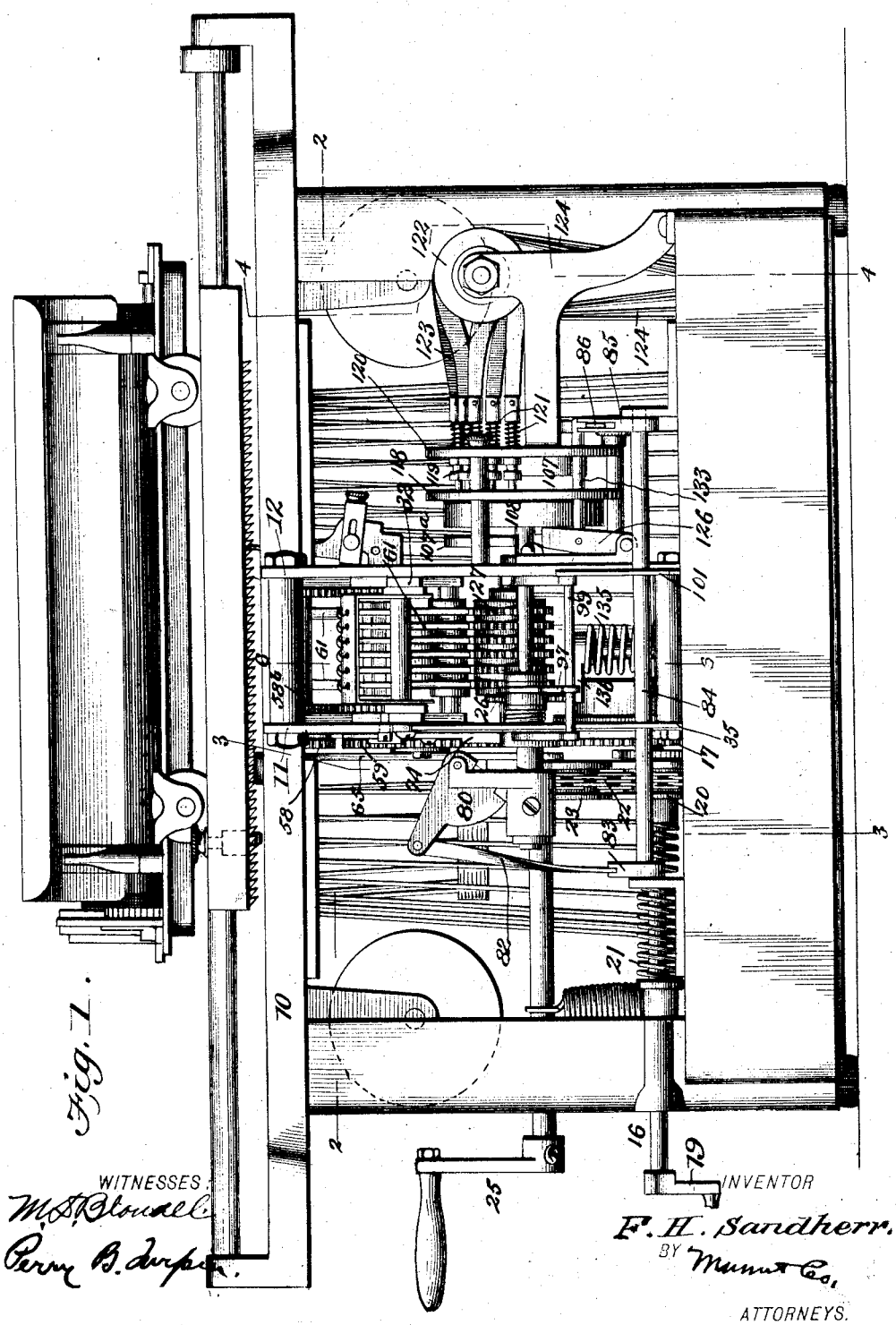

No. 669,286. Patented Mar. 5, 1901.
F. H. SANDHERR
ADDING APPARATUS
(Application filed Sept. 29, 1899.)

(No Model.) 14 Sheets—Sheet 1.

WITNESSES
INVENTOR
F. H. Sandherr,
BY Munn & Co,
ATTORNEYS.

No. 669,286. Patented Mar. 5, 1901.
F. H. SANDHERR.
ADDING APPARATUS.
(Application filed Sept. 29, 1899.)
(No Model.) 14 Sheets—Sheet 2.
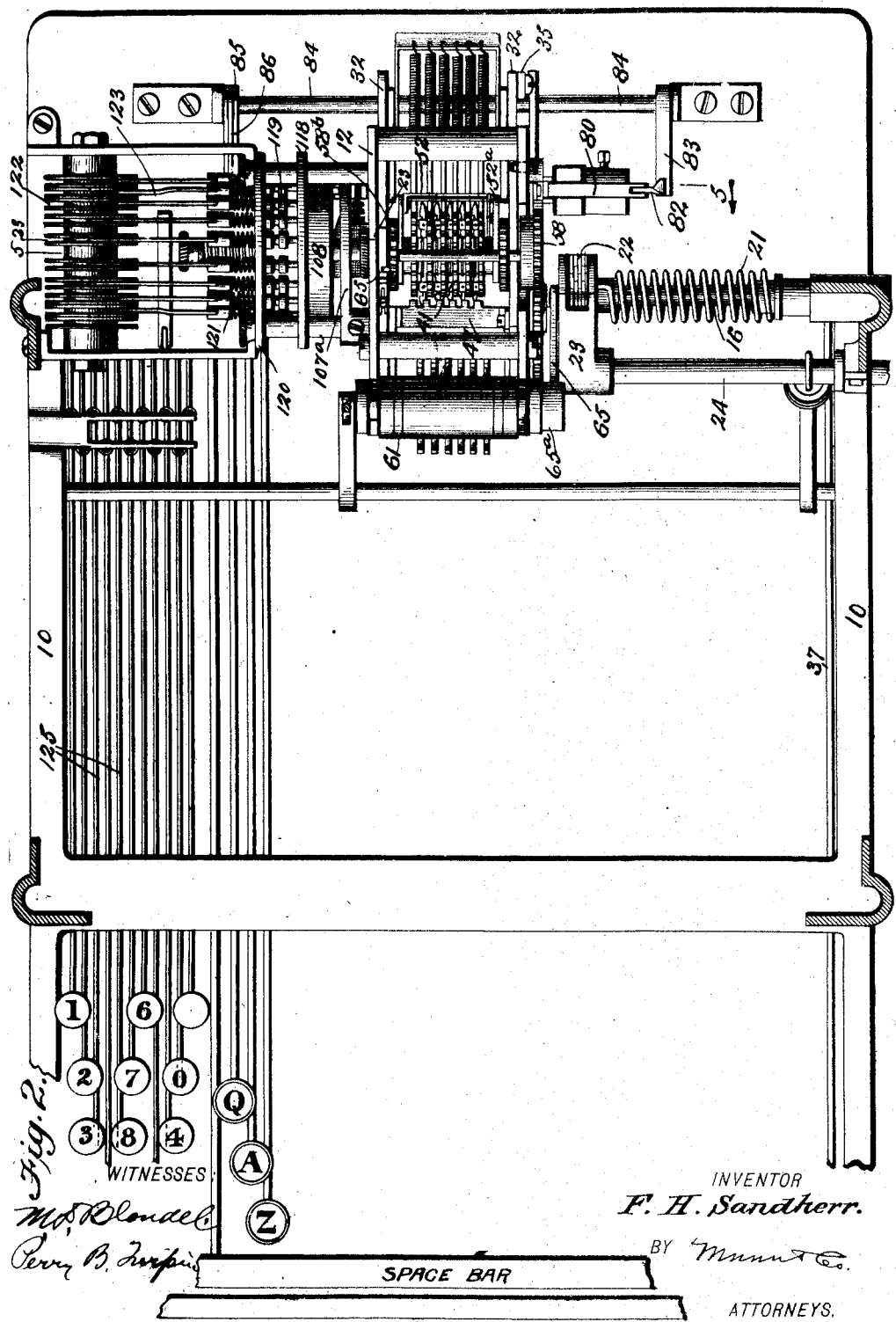
INVENTOR
F. H. Sandherr.

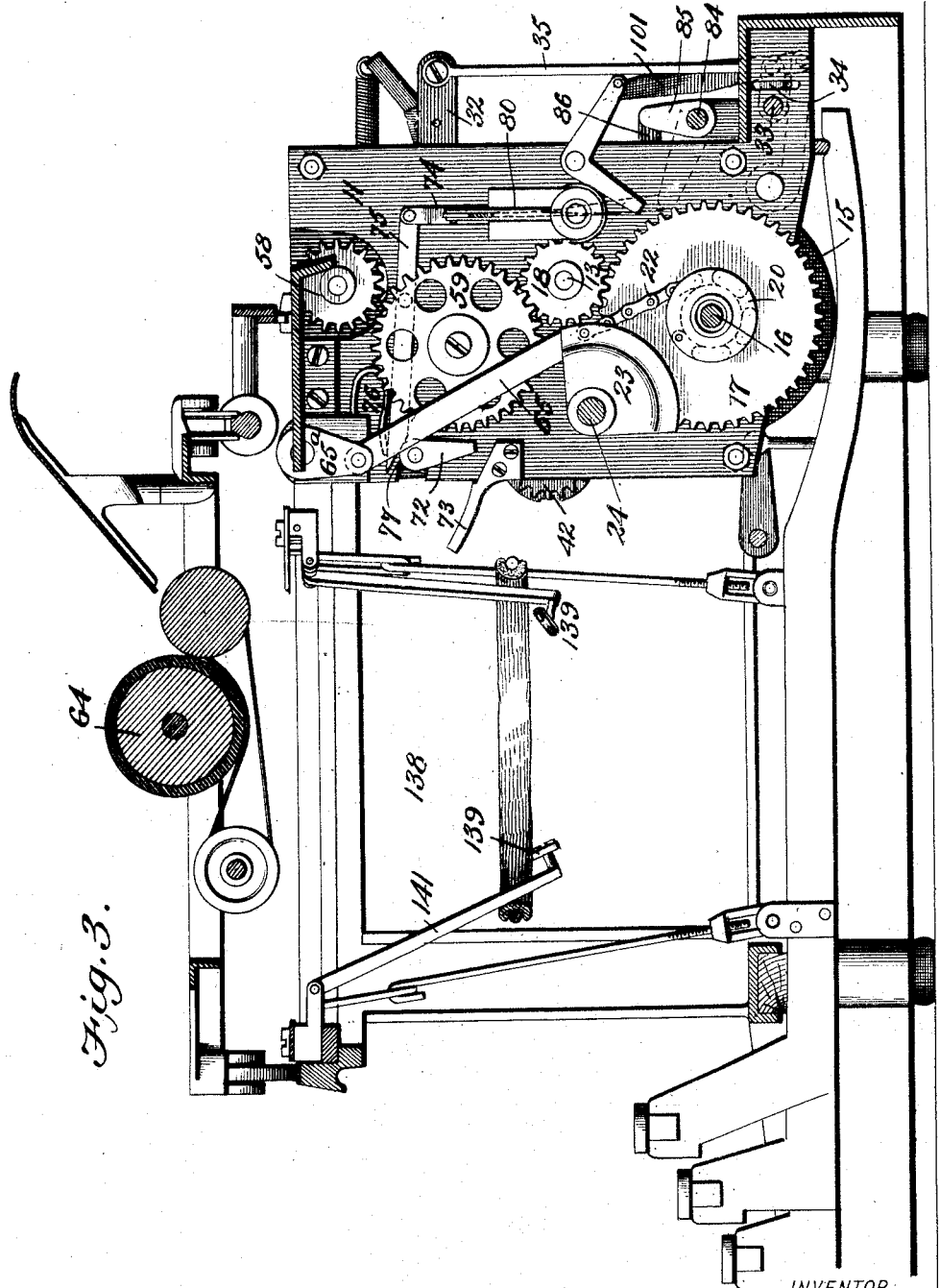

No. 669,286. Patented Mar. 5, 1901.
F. H. SANDHERR.
ADDING APPARATUS.
(Application filed Sept. 29, 1899.)
(No Model.) 14 Sheets—Sheet 4.
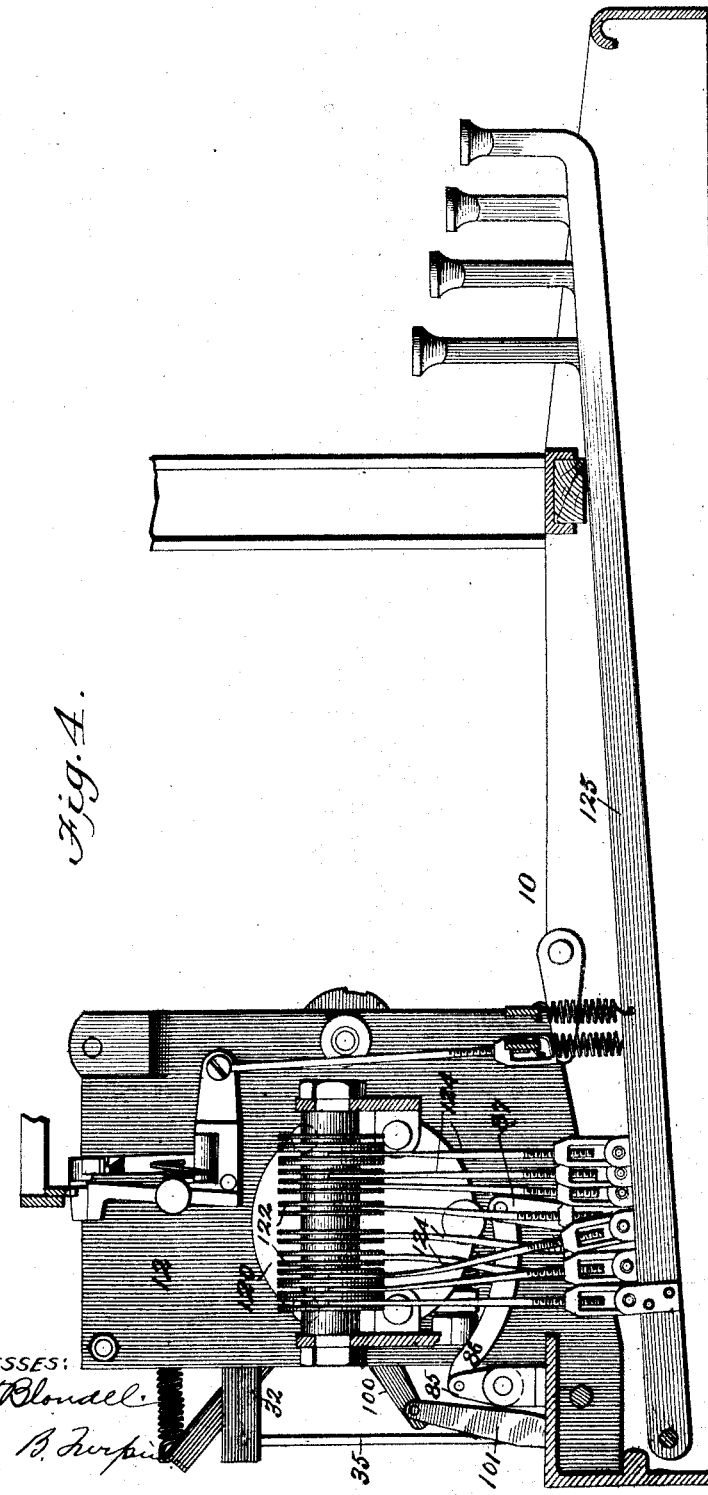

No. 669,286. Patented Mar. 5, 1901.
F. H. SANDHERR.
ADDING APPARATUS.
(Application filed Sept. 29, 1899.)
(No Model.) 14 Sheets—Sheet 5.
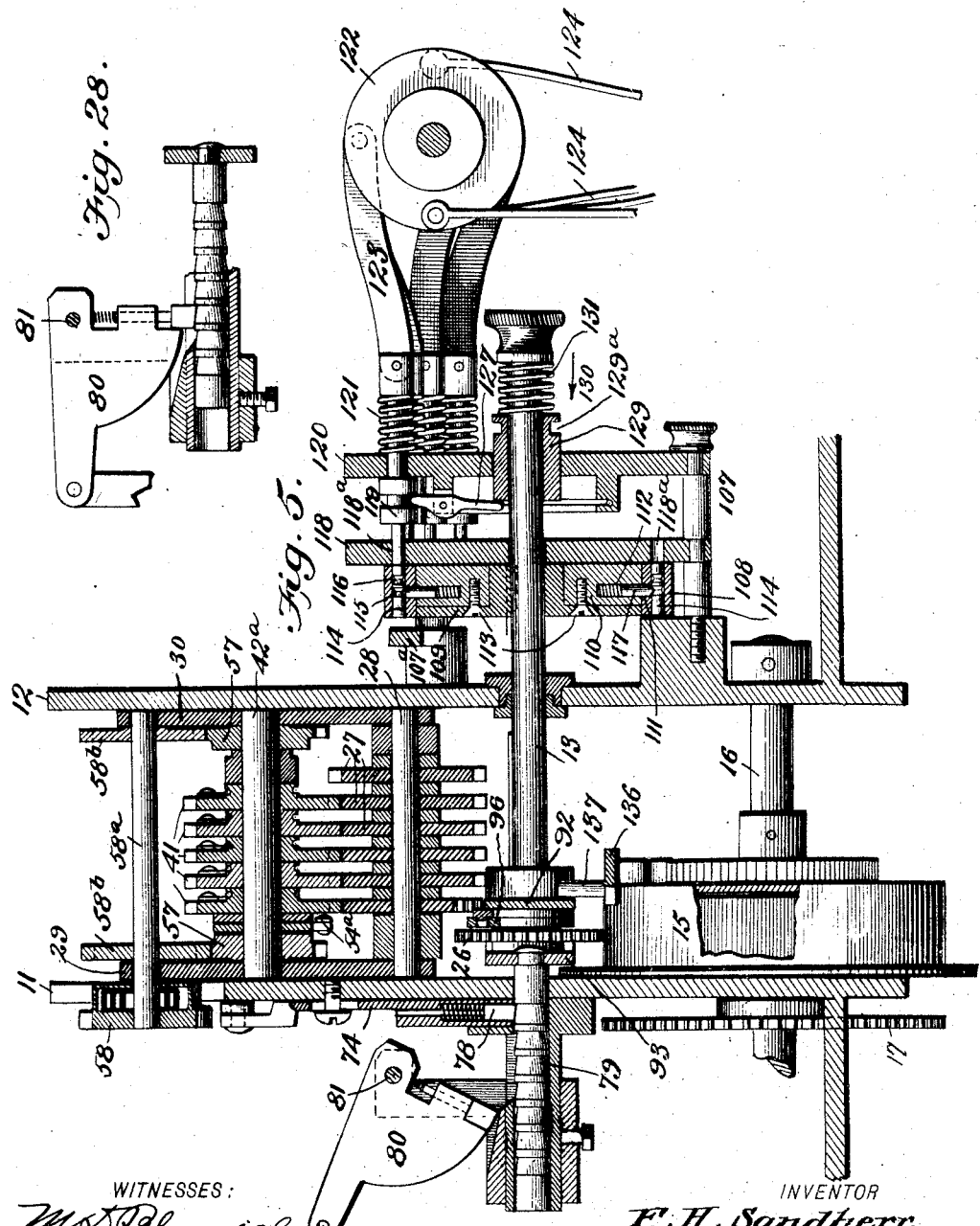

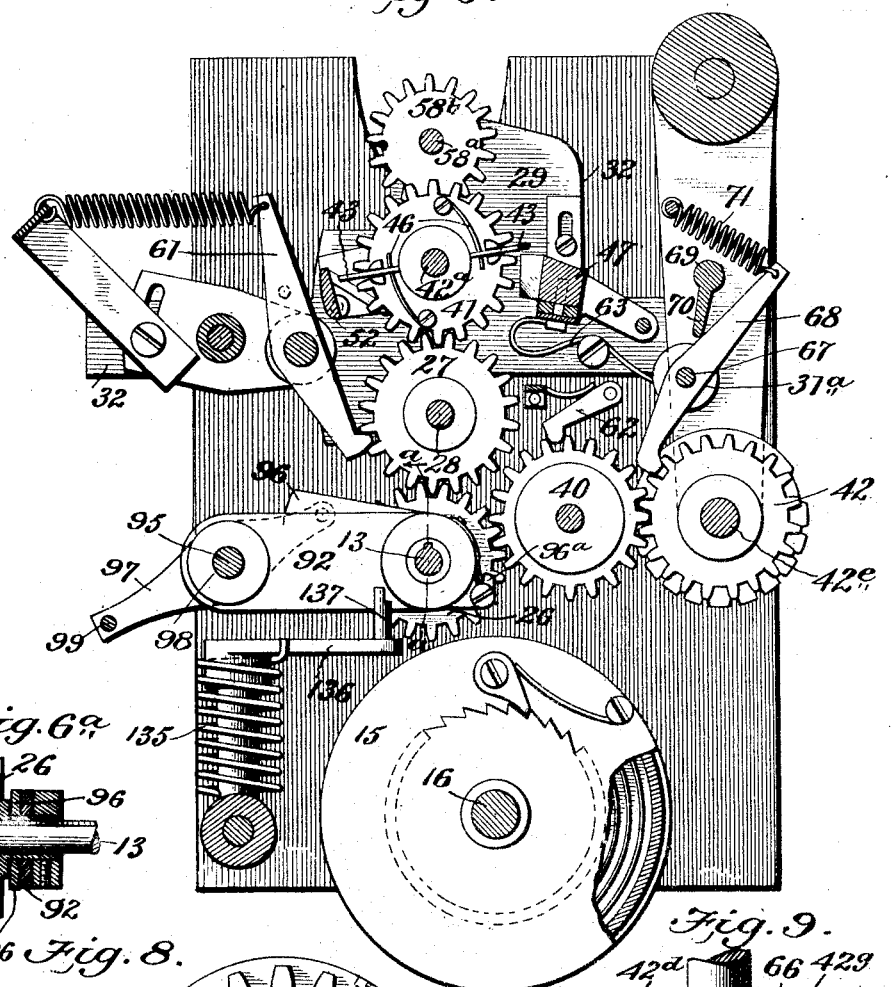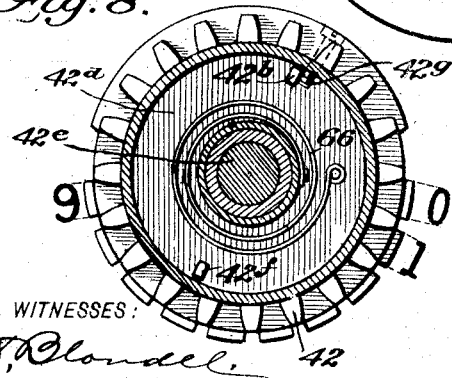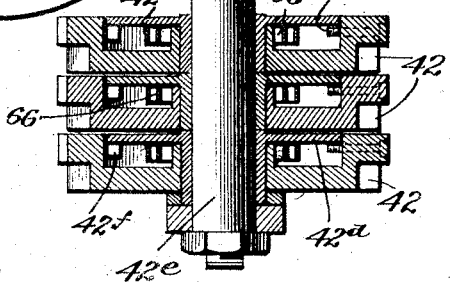

No. 669,286. Patented Mar. 5, 1901.
F. H. SANDHERR.
ADDING APPARATUS.
(Application filed Sept. 29, 1899.)

(No Model.) 14 Sheets—Sheet 7.

WITNESSES:
M. D. Blondel.
Perry B. Turpin.

INVENTOR
F. H. Sandherr,
BY Munn & Co.
ATTORNEYS.

No. 669,286. Patented Mar. 5, 1901.
F. H. SANDHERR.
ADDING APPARATUS.
(Application filed Sept. 29, 1899.)
(No Model.) 14 Sheets—Sheet 8.
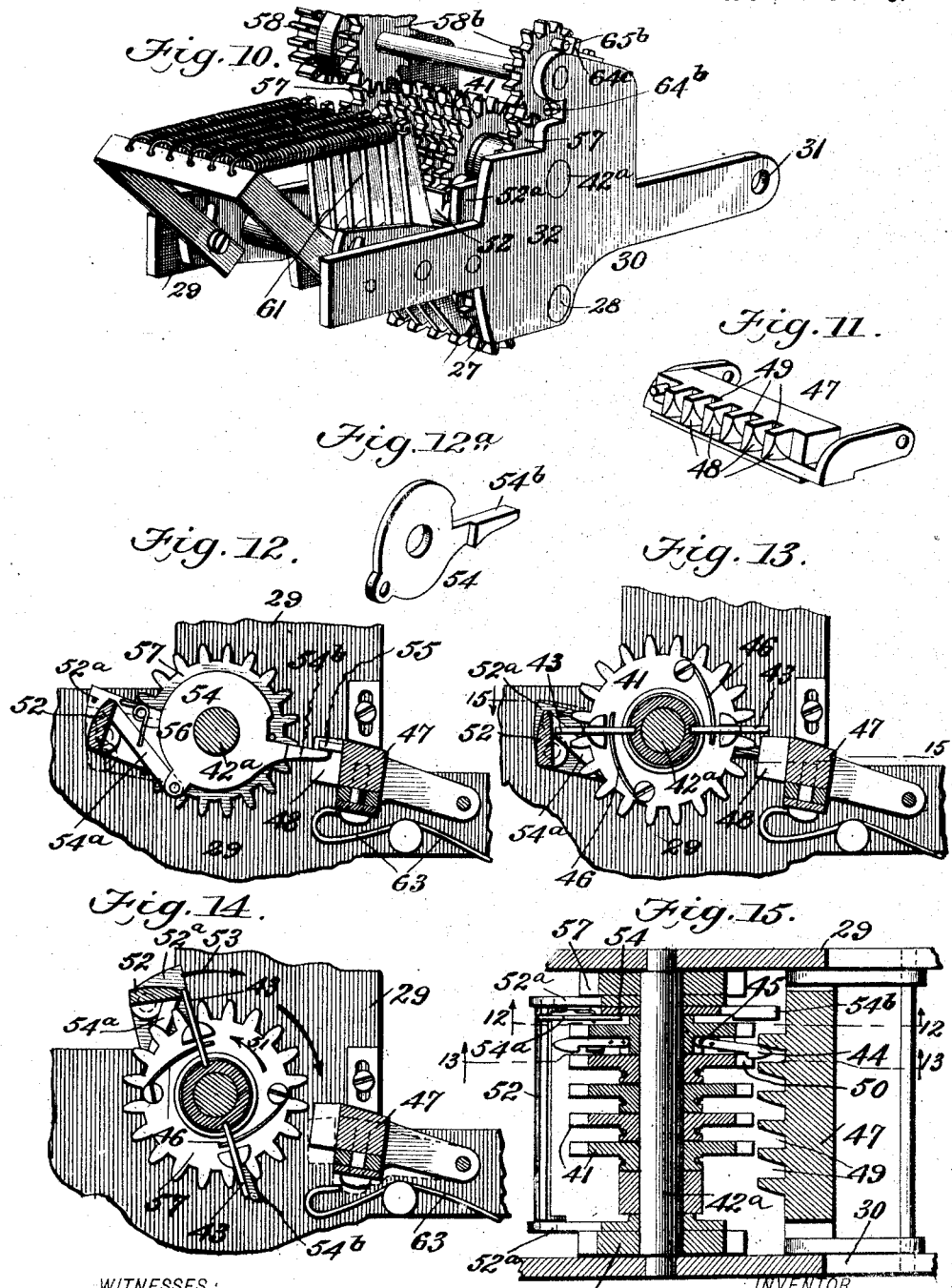

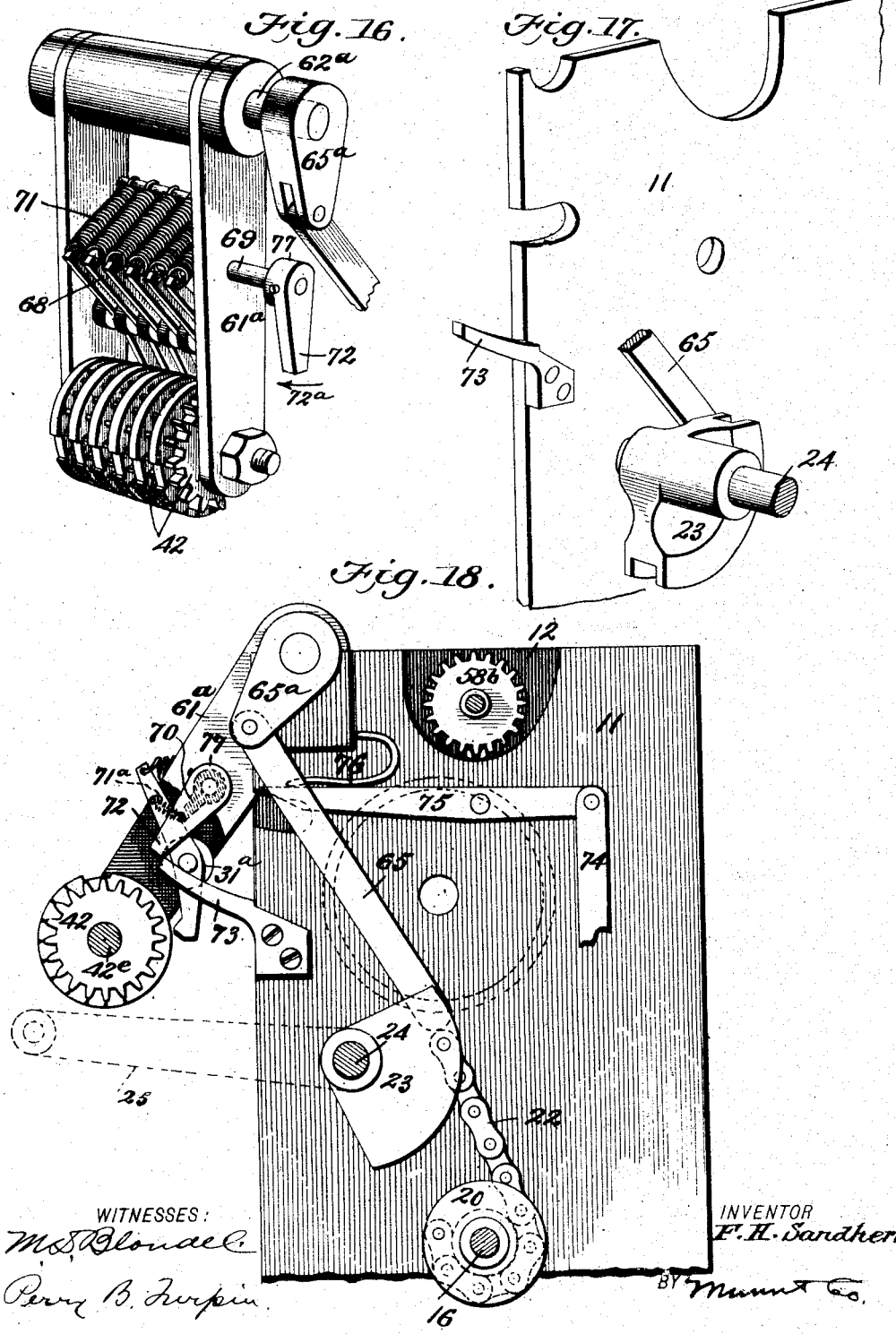

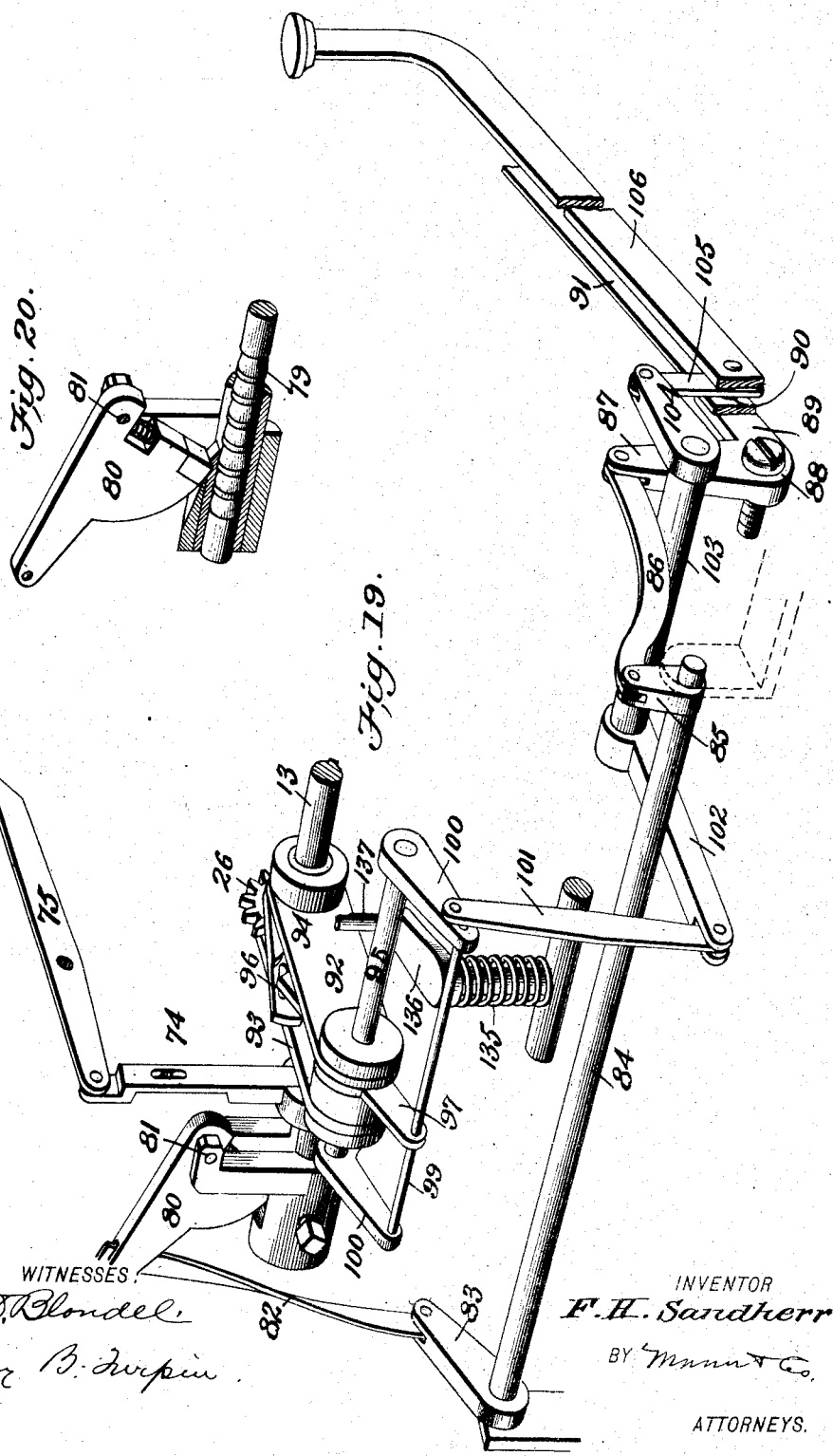

No. 669,286. Patented Mar. 5, 1901.
F. H. SANDHERR.
ADDING APPARATUS.
(Application filed Sept. 29, 1899.)
(No Model.) 14 Sheets—Sheet 11.
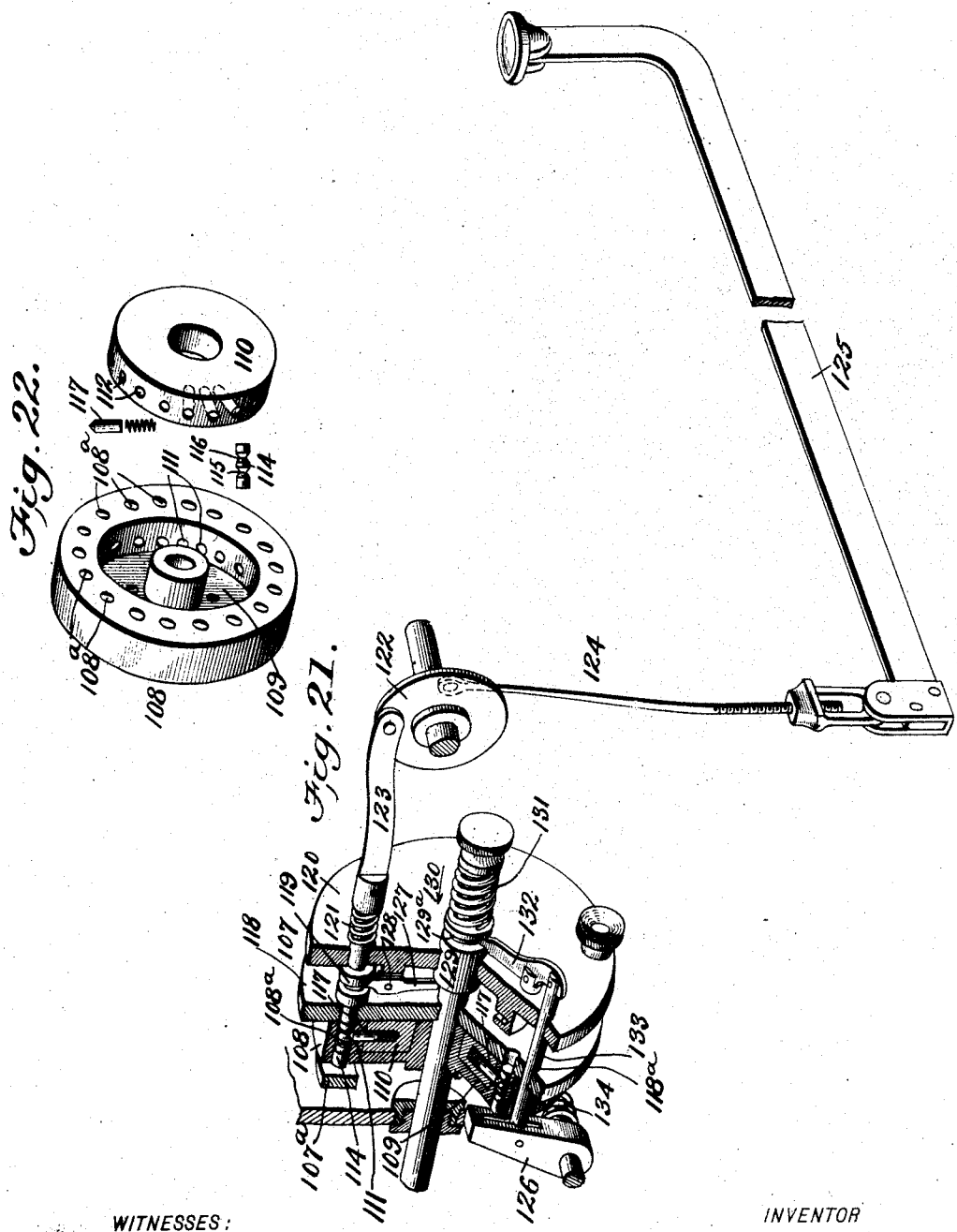
WITNESSES:
INVENTOR
F. H. Sandherr.
BY
ATTORNEYS.

No. 669,286. Patented Mar. 5, 1901.
F. H. SANDHERR.
ADDING APPARATUS.
(Application filed Sept. 29, 1899.)
(No Model.) 14 Sheets—Sheet 12.

WITNESSES:
M. S. Blondel
Perry B. Turpin

INVENTOR
F. H. Sandherr
BY Munn & Co.
ATTORNEYS.

No. 669,286. Patented Mar. 5, 1901.
F. H. SANDHERR.
ADDING APPARATUS.
(Application filed Sept. 29, 1899.)
(No Model.) 14 Sheets—Sheet 13.

WITNESSES:

INVENTOR
F. H. Sandherr.
BY
ATTORNEYS.

No. 669,286. Patented Mar. 5, 1901.
F. H. SANDHERR.
ADDING APPARATUS.
(Application filed Sept. 29, 1899.)
(No Model.) 14 Sheets—Sheet 14.

WITNESSES:
M. D. Blondel
Perry B. Turpin

INVENTOR
F. H. Sandherr.
BY Munn & Co.
ATTORNEYS.

UNITED STATES PATENT OFFICE.

FREDERICK H. SANDHERR, OF ST. LOUIS, MISSOURI, ASSIGNOR OF THREE-FIFTHS TO CHARLES E. WARE, FRANK A. NAGEL, AND FREDERICK A. SCHREIBER, OF SAME PLACE.

ADDING APPARATUS.

SPECIFICATION forming part of Letters Patent No. 669,286, dated March 5, 1901.

Application filed September 29, 1899. Serial No. 732,127. (No model.)

*To all whom it may concern:*

Be it known that I, FREDERICK H. SANDHERR, of St. Louis, in the State of Missouri, have invented a new and useful Improvement in Adding Apparatus, of which the following is a specification.

My invention is an improvement in calculators, being in the nature of an improvement in adding-machines having recording or printing devices arranged to coöperate with the printing devices of a type-writer and including in the embodiment shown a total mechanism, so the machine may be employed for ordinary writing, for ordinary adding, for tabulating the figures of addition and striking the total, or, in the making out of accounts and statements, for producing the text, the tabulated figures, and the totals as may be desired.

The invention consists in certain novel constructions and combination of parts, as will be hereinafter described, and pointed out in the claims.

Figure 7:
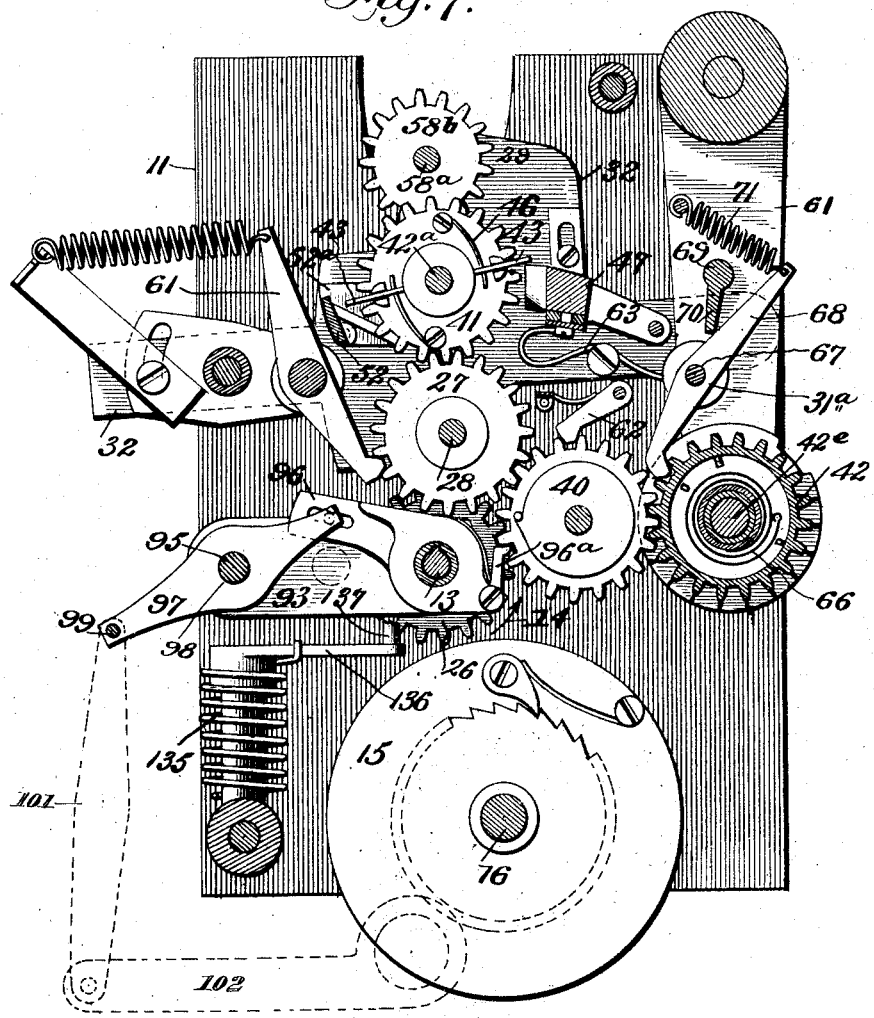
Figure 27:
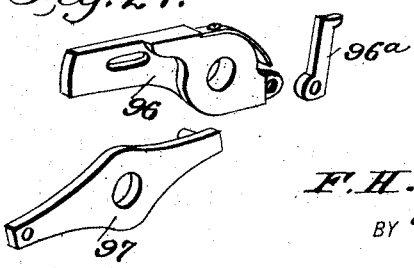
Figure 23:
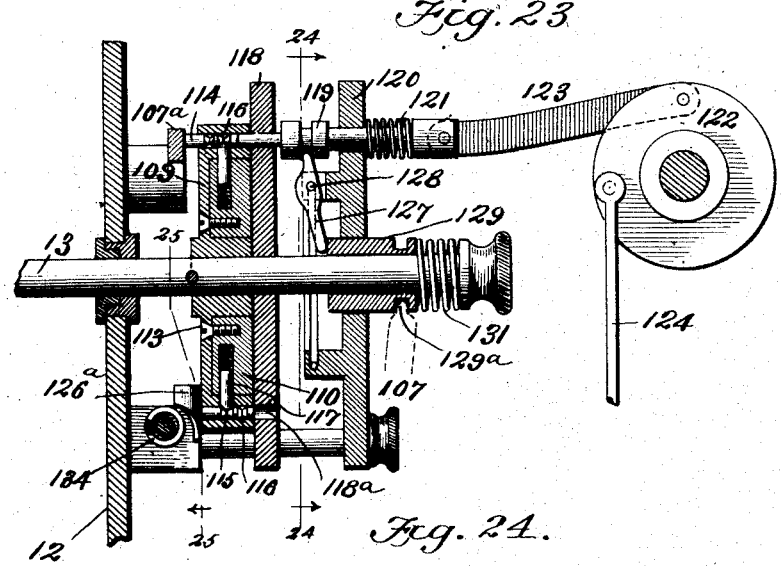
Figure 24:
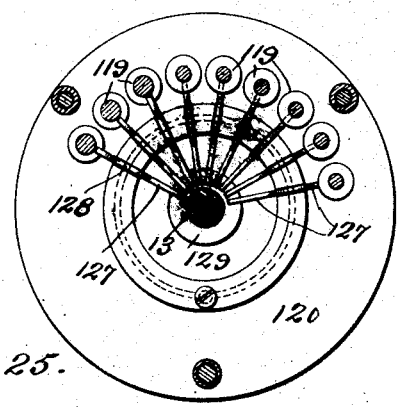
Figure 25:
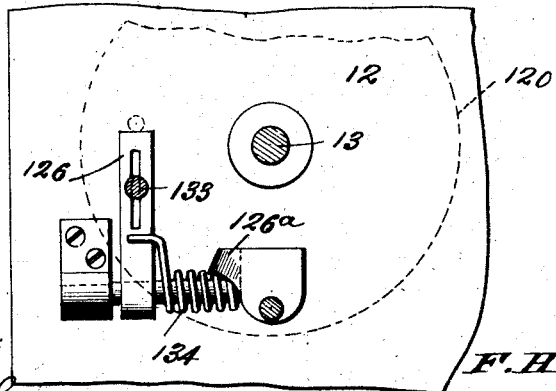
Figure 26:
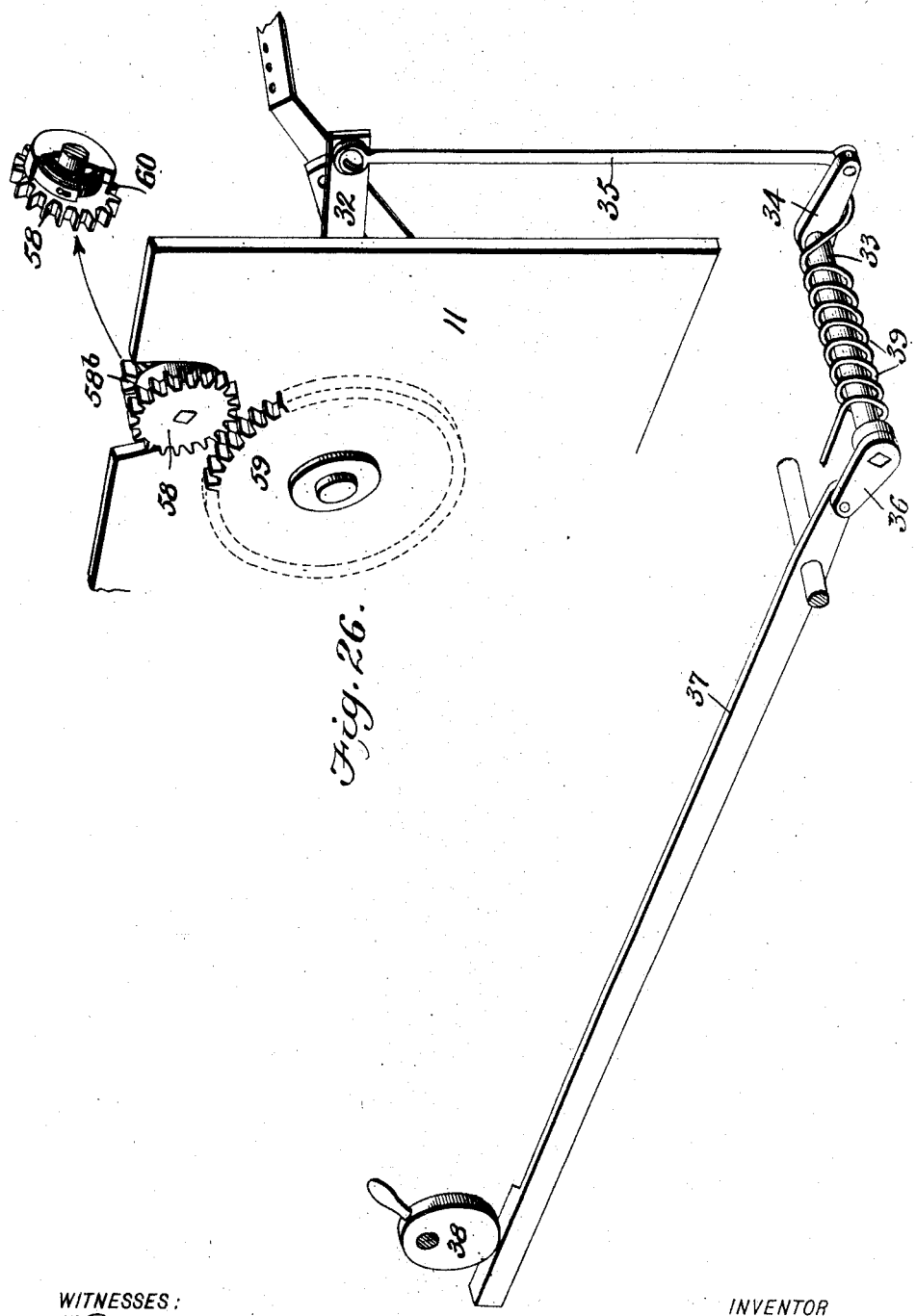
Figure 29:
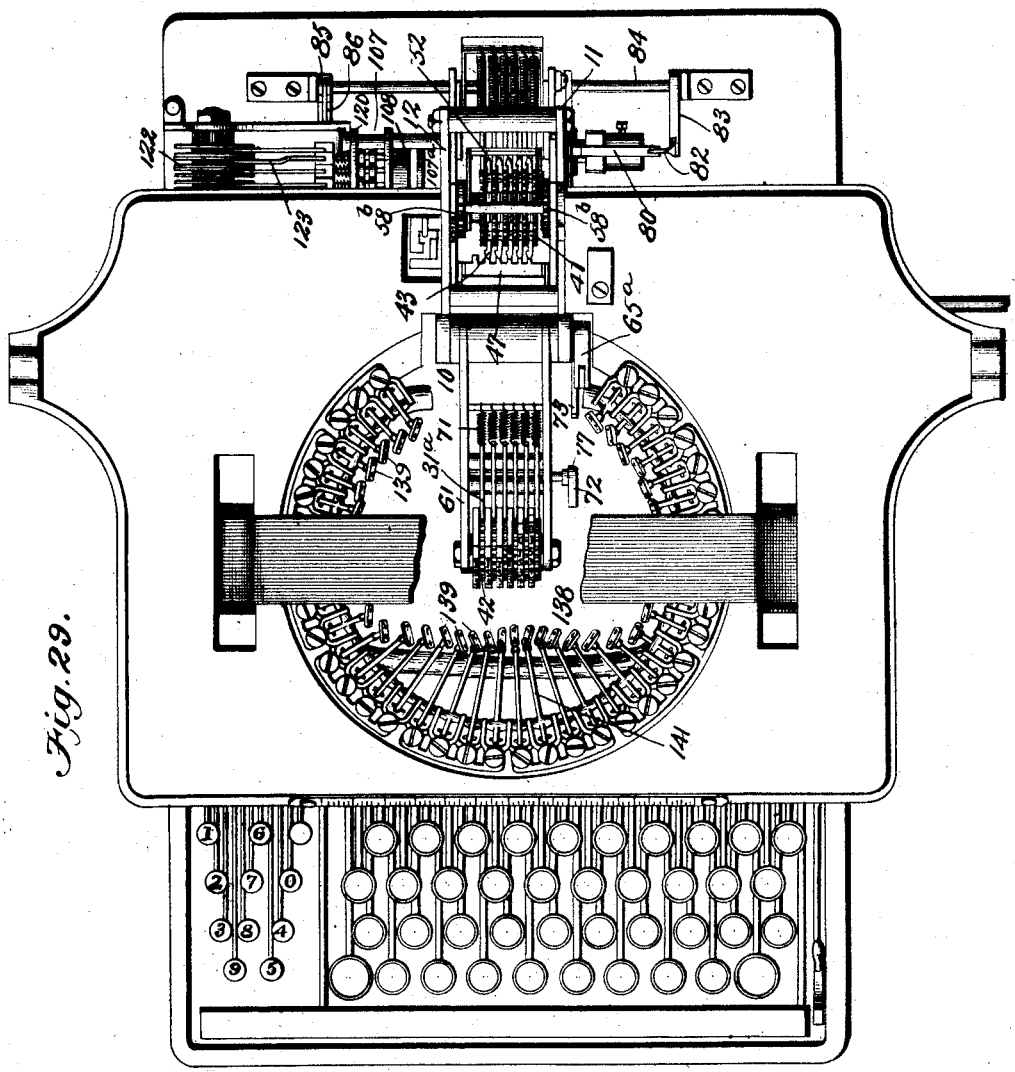

In the drawings, Figure 1 is a rear elevation of an apparatus embodying my invention. Fig. 2 is a top plan view, parts being broken away on about the dotted line 2 2 of Fig. 1. Fig. 3 is a vertical section on about line 3 3 of Fig. 1. Fig. 4 is a vertical section on about line 4 4 of Fig. 1. Fig. 5 is a cross-section on about line 5 5 of Fig. 2. Fig. 6 is a vertical section on about line 6 6 of Fig. 1, showing the parts in position for adding. Fig. 6ª is a detail section on about line $a\, a$ of Fig. 6. Fig. 7 is a vertical section similar to Fig. 6, showing the parts in the position for transferring the total. Figs. 8 and 9 are detail views illustrating the printing-wheels and the actuating-springs and stops. Fig. 10 is a detail perspective view of the carrying and accumulating disks, with the movable frame supporting the same and some of the coöperating parts. Fig. 11 is a detail perspective view of the stop-bar for the pins of the accumulating-disks. Fig. 12 is a detail cross-section on about the line 12 12 of Fig. 15, showing the carrying-bar tilted back to permit the free passage beneath it of the pins of the accumulating-disks. Fig. 12ª is a detail view of the tripping-disk. Fig. 13 is a detail cross-section on about line 13 13 of Fig. 15. Fig. 14 is a cross-section similar to Fig. 13, showing the total-transferring devices as in the operation of transferring the total. Fig. 15 is a detail longitudinal section on about line 15 15 of Fig. 13, showing the pins of the accumulating-disks thrown over laterally to engage the next higher disk. Fig. 16 is a detail perspective view of the printing-frame and the parts carried thereby. Fig. 17 is a detail perspective view of a part of one of the frame-plates, showing the means for releasing the detent-pawls of the printing-wheel and part of the spring-winding mechanism and of the mechanism for operating the printing-frame. Fig. 18 is a detail side view of the printing-frame and adjacent parts, showing the pawls of the printing-wheels released, so such wheels can be moved back by their springs to their initial positions. Fig. 19 is a detail perspective view illustrating the means for setting the operating-wheel into engagement with the different disks it is designed to operate, also the zero-setting-up-device and its operating means. Fig. 20 is a detail perspective view of a portion of the rack-bar and the pawl-lever for operating the same. Fig. 21 is a detail perspective view of the step-by-step mechanism for permitting the movement of the main wheel, parts being broken away and others shown in section. Fig. 22 shows the several parts of the step-by-step wheel of the main shaft detached. Fig. 23 is a detail vertical section on about line 23 23 of Fig. 2. Fig. 24 is a detail cross-section on about line 24 24 of Fig. 23. Fig. 25 is a detail sectional view on about line 25 25 of Fig. 23. Fig. 26 is a detail perspective view illustrating the means for throwing the frame carrying the accumulating-disks into and out of position for transferring the totals. Fig. 27 is a detail perspective view of the zero-setting-up lever. Fig. 28 is a detail view of the step-by-step mechanism for moving the operating-wheel; and Fig. 29 is a top plan view of the improved apparatus, the carriage being removed.

In the accompanying illustration I have represented my invention as embodied in connection with a type-writing machine of the Remington form; but I purpose in the drawings to illustrate the invention as embodied in that class of type-writing machines generally recognized as "basket-machines," in which the type-bars range around or form a basket and operate to the center of the same; but it should be understood that I do not wish to be limited in the broad features of my invention to the specific form of typewriting machine shown, as the adding and recording or printing mechanism can readily be adapted to other forms of type-writing machines without departing from the spirit of my invention.

By my improvement I seek to provide a simple construction by which to accurately add any sum within the range of the machine, strike and print the several factors and the sum total, and to effect the printing in such relation to the printing devices of the typewriting machine as to enable the coöperation of the printing devices of the adding mechanism with those of the type-writing machine in stating accounts and other tabulated statements where the figures and text are combined in forming the statement.

In the construction shown I employ in connection with the framing 10 of the type-writing machine a framing composed of two side plates 11 and 12, which may be cast integral with the framing 10 or be made separate and suitably secured in place. The main shaft 13 is journaled in the side plates 11 and 12 and is given a tension in the direction indicated by the arrow 14 in Fig. 7. In connection with this main shaft 13 I provide an escapement-releasing mechanism (shown in Figs. 21, 22, and 23 and hereinafter described) which permits the shaft to turn with a step-by-step motion in the direction indicated by said arrow 14. The length of the steps or movement of the shaft at each operation may vary according to the key struck, the said shaft moving from one to nine times the unit distance, according to the figure it is desired to add. The shaft 13 is driven in the construction shown by a spring-drum 15, which has a shaft 16 and a gear 17, meshing with a pinion 18 on the shaft 13. The drum 15 may be wound by any suitable form of key whenever necessary, a handle 19 being shown on the shaft 16 of the drum in the present instance; but I find it desirable to furnish means for automatically winding the drum by the operation of the printing devices of the adding mechanism. To this end I furnish a pulley 20, clutched on the shaft 16, operated in one direction by the spring 21 and in the other direction by a chain connection 22, with a pulley-section 23 in the shaft 24 of the lever 25 for operating the printing devices of the adding mechanism, so that each operation of the said printing devices will serve to wind the spring-drum, as will be understood from Figs. 17 and 18 of the drawings.

The operating-wheel 26 is keyed on and slidable along the main shaft 13, as shown in dotted lines in Fig. 5, so it can be set into mesh with any of the carrying-disks 27. These disks 27, of which I have shown six, are alike and are designed to count from units at the left when viewed from the rear, as in Fig. 1, to tens, hundreds, &c., to any degree to which it may be desired to extend the capacity of the apparatus.

The carrying-disks 27 are supported on a shaft 28, carried by a frame 32, composed of side plates 29 and 30, which are secured between the side plates 11 and 12, being pivoted at their front ends at 31, (see Fig. 10,) so their rear ends can be raised or lowered to set the carrying-disks into and out of position to be meshed by the operating-wheel 26. In moving the frame 32 into and out of adding position I prefer to employ a rock-shaft 33, Fig. 26, having a crank 34, connected by a pitman 35 with the rear end of the frame 32, and a crank 36, connected with a lever 37, which is operated in one direction by an eccentric 38 to lower the rear end of the frame 32 to set the carrying-disks into position to transfer the totals to the total-printing mechanism. This position is shown in Fig. 7. The frame 32 is raised at its rear end to position for adding, as shown in Fig. 6, when the eccentric 38 is released by means of the spring 39, operating upon the shaft 33. The purpose of thus adjusting the frame 32 is to permit the setting of such frame so the carrying-disks will be in position for being meshed by the operating-wheel in the operation of adding, as shown in Fig. 6, and to permit the lowering of such carrying-disks from the position shown in Fig. 6 to that shown in Fig. 7, in which latter figure the operating-wheel 26 is adjusted out of mesh with the carrying-disks and the latter are meshed directly with the intermediate disks 40, so the total can be transferred from the accumulating-disks 41 through the carrying-disks to the intermediate disks 40, and thence to the printing-wheels 42, as will be more fully described hereinafter.

The accumulating-disks 41, of which I use one for each of the carrying-disks, are meshed with their respective carrying-disks and are supported on a shaft 42ª, which is carried by the frame 32. These disks 41 preferably have twenty teeth and are arranged to transfer each to the next disk once for each ten of their teeth. To this end I provide each accumulating-disk 41 with a pin 43, which projects at its outer end beyond the teeth of the disk 41 and is arranged at such outer end to be moved laterally, so its head-like portion 44 will engage the teeth of the next disk in the operation of the apparatus. The pin 43 is pivoted at its inner end at 45, Fig. 15, so its outer end can move laterally and engage at 50 with the next disk, and it is actuated by a spring 46, which tends to hold the pin 43 normally in the plane of its disk and yet permits its lateral adjustment when desired. This lateral adjustment of the pin 43 (see Fig. 15) for advancing the next higher one of the accumulating-disks is effected by means of the bar 47, arranged across the front sides of the accumulating-disks and provided with inclined guides 48, (see Fig. 11,) forming one side of slots 49, through which the pins 43 pass as the accumulating-disks are advanced. The inclined guide-surfaces 48 operate to push the pins 43 laterally over, so the portions 44 of said pins 43 will engage with the next disk while the pin 43 is passing through the bar 47. Thus the said next higher disk will be advanced with the preceding disk one step while the pin 43 is passing through the bar 47, the pin springing back out of engagement with the adjacent wheel when the pin has passed the said bar 47. As the addition is effected on the carrying-disks it is transferred therefrom to the accumulating-disks, and the total of addition is thus carried by the accumulating-disks, it corresponding to the steps to which the pins 43 of the several accumulating-disks have moved forward in the direction indicated by the arrow 51 in Fig. 14 from the bar 47. It follows, therefore, that if the number of steps the pins 43 are distant from the bar 47 corresponds with the total accumulated on the disks 41 then if said disks 41 be turned back in the reverse direction severally corresponding distances they will move a distance corresponding to the total, and if they be meshed with wheels which in turn mesh with the printing-wheels the latter will be automatically set to print the total. To thus set back the accumulating-disks, I provide what for convenience of reference I term the "total-carrying bar" 52, which swings over the accumulating-disks 41 to and from the bar 47. When swung back in the direction indicated by the arrow 53 in Fig. 14, this bar 52 will engage the projecting pins 43 and will move the same and their corresponding disks 41 back to the bar 47, thus setting such disks back a number of steps equaling the number of steps they have been previously set up in securing the total. By this means I am able to set the printing-wheels to the total in a simple accurate manner. The bar 52 is carried by two arms 52$^a$, to which it is pivoted near its rear edge, so its forward edge can be set back out of the path of the pins 43 until such time as it is desired to transfer the total to the printing-disks. The arms 52$^a$ are pivoted on the shaft 42$^a$, and when in normal position the bar 52 lies on the side of the accumulating-disks opposite the bar 47, and the edge of the bar 52 next the disks is upturned (see Fig. 12) by means of a tripping-disk 54, which rocks on the shaft 42$^a$, is connected by a link 54$^a$ with the bar 52, and is provided with a projection 54$^b$, which is arranged to abut against a stop 55 to tilt the bar 52 relatively to its arms 52$^a$ to the position shown in Fig. 12, when the pins on the disks can pass freely under it. A spring 56 acts in opposition to the tripping-disk and immediately resets the total-carrying bar to the position shown in Fig. 14, when the projection 54$^b$ is moved out of engagement with the stop 55. In this last position the bar 52 will engage all the projecting pins of the accumulating-disks which may project between it and the bar 47, so the total-bar 52 will carry such pins back to the zero at the bar 47 when the said bar 52 is operated for such purpose.

In operating the total-carrying bar I provide its arms 52$^a$ with pinions 57, encircling the shaft 42$^a$. I employ one of these pinions 57 on each arm 52$^a$, because thereby I connect and brace the arms 52$^a$ together, this being desirable because of the pivotal connection of the total-carrying bar with the said arms 52$^a$. A shaft 58$^a$ has pinions 58$^b$ meshing with the pinions 57, and such shaft 58$^a$ is extended and receives a pinion 58, which when the frame 32 is lowered into position for printing the total meshes with a gear 59, which in turn meshes with the pinion 18 on the shaft 13, so that if the "9" key be operated at this time it will tend to throw the total-carrying bar back a distance far enough to carry a "9" on the accumulating-disks back to the stop-bar 47. I use the "9" key in this operation because by it I get the greatest throw of the parts, and it should be understood that the operation of the "9" key at this time will not operate the adding devices, because in striking the total the operating-wheel 26 is shifted laterally out of engagement with the said carrying-disks.

When the total is struck by turning the wheel 58, as described, and the said wheel 58 is lifted out of mesh with the wheel 59, such wheel 58 and its shaft are returned, with the total-carrying bar, to normal position by means of a spring 60. This spring 60 (see Fig. 26) in the construction shown is secured to the frame and gear 58 and operates by its tension to return the said parts as desired.

Now, in operation, if the parts be very accurately fitted and are not worn or loose the bar 47 may be fixed and unyielding and form a solid stop against which to bring the total-carrying bar 52 in setting back the totals for the purpose of transferring the same to the printing-wheels. I prefer, however, to arrange this bar 47 so it will yield and may be depressed slightly, (see Fig. 14,) as thereby I am able to take up lost motion and move the adding-disks the desired distance to insure the proper movement thereof and of the intermediate disks to set the printing-wheels to the desired point, as well as to insure the proper resetting of the carrying and intermediate disks to secure the proper engagement therewith of the detents 61 and 62 and 31$^a$, by which the parts are held from displacement by the momentum of the machine. To this end I pivot the bar 47 so it may be pressed at its end next the accumulating-disks and support and return it by a spring 63. As the spring 63 returns the bar 47 when pressure thereon is released, such bar 47, by moving up the pins 43, will return the accumulating-disks, and thereby the carrying-disks, to bring the carrying-disks and intermediate disks to position to be properly meshed by the operating-wheel 26 when the latter is moved to position to engage with the said carrying-disks. I therefore prefer to make the bar 47 depressible and to regulate the degree to which it may be depressed by an adjustable stop 64$^b$ on the frame, which is engaged by a projection 65$^b$ on one of the pinions 58$^b$. Such projection 65$^b$ also engages a stop 64$^c$ on the frame and limits the motion of the pinion 58$^b$ and of the total-carrying bar in the return movement given it by the spring 60.

The printing-wheels are carried by a frame 61$^a$, pivoted at its upper end at 62$^a$ and swinging at its lower end, where it supports the printing-wheels, up to a position where it will print against the paper on the paper-carrier 64. (See Fig. 3.) The handle 25 may be operated to swing the frame 61$^a$ into printing position through the medium of the pitman 65, (see Fig. 18,) which connects its crank 65$^a$ with the pulley-section 23 to rewind the spring-drum of the main shaft at each operation of the printing-frame.

The printing-wheels are each independently spring-actuated by springs 66, which tend to automatically return the same to neutral position or one step beyond the zero-point when their detents 31$^a$ are released. The detents 31$^a$ are actuated into engagement with the printing-wheels by means of springs 71, as shown. I release all of these detents 31$^a$ on the return movement of the printing-frame after each printing operation has been effected, so that all the disks which have figured in the printing operation may be returned by these springs 66 to the neutral position. To effect this automatic release of the detents 31$^a$, which are pivoted at 67 and have arms 68, I provide the rocking releasing-shaft 69, journaled in and swinging with the printing-frame and having a lug or blade 70, which may be operated to engage the arms 68 of the detents and release the latter from the printing-wheels. The releasing-shaft is operated in one direction by the spring 71$^a$ and in the opposite direction by the crank-arm 72 on the shaft 69, which crank-arm 72 when operated in the direction of the arrow 72$^a$ (see Fig. 16) will move the shaft 69 to release the detents. The arm 72 engages and slides upon an abutment 73 on the framing during the movement of the printing-frame to printing position, such operation moving the blade 70 away from the detents 31$^a$; but on the return movement of the frame 61 the crank-arm 72 will ride upon the abutment 73, and the shaft 69 will be rocked, as indicated by arrow 72$^a$, to cause its blade 70 to swing against the arms 68 of the detents 31$^a$ and release such detents from engagement with the printing-wheels as the latter return from printing position to position for another operation. Thus it will be seen the springs 66 return the printing-wheels to their neutral positions after each printing operation, the detents 31$^a$ holding such wheels in any adjustment to which they may be set by the operating devices before described.

The printing-wheels are numbered from "0" up to "9," and in advance of the zeros I provide blank spaces, so the printing-wheels stand in normal position not to print, but to present blank spaces to the printing position. This is necessary, because in printing the printing-wheels are all moved up bodily against the paper, and if they stood with the zeros in printing position all the disks that had not been set up to position would print "0" both to the right and left of the printed figures. To insure the stopping of the printing-wheels in position to present the blank spaces to the printing position, I provide stop devices consisting of projections 42$^a$ on the printing-wheels, which engage projections 42$^b$ on the disks 42$^d$, which latter are fast on the shaft 42$^e$, on which the printing-wheels turn. This construction serves to stop the printing-wheels accurately in their initial positions, where they present blanks to the printing-line. I also provide a stop projection 42$^f$, which coöperates with stop 42$^a$ to prevent the advancing of the printing-wheels beyond the "9" position in case the step-by-step feed mechanism should slip or become disarranged, thus preventing injury to the springs which operate the printing-wheels. The printing-frame also operates when swung to printing position to release the detent devices of the mechanism for shifting the operating-wheel to units, tens, hundreds, &c. To this end I connect the said detent 74 with a lever 75, which is engaged by a spring 76, whose tension is constantly exerted to release the detent. The printing-frame has a portion at 77, (see Figs. 3, 16, and 18,) which when the frame is in the position shown in Fig. 3 bears under the lever 75 and operates to hold the said lever and its detent in opposition to the spring 76 and in position so the spring-actuated point 78 of the detent will be held in position for engagement with the rack-bar 79 for holding the operating-wheel in its different positions. When the printing-frame is swung to printing position, its portion at 77 moves out of engagement with the lever 75 and the spring 76 will operate the lever 75 to lift the spring-point 78 of the detent clear of the rack-bar 79, so the latter can return to its starting-point under the action of the spring 135, presently described. This rack-bar 79 is operated step by step by the pawl-lever 80, which is pivoted at 81 and is connected by a link 82 with the crank 83 on the rock-shaft 84. The rock-shaft 84 (see Fig. 19) also has a crank 85, which is connected by a link 86 with one arm 87 of the bell-crank lever 88, whose other arm 89 is connected at 90 with the key-lever 91, by which the operating-wheel is set up as desired.

The operating-wheel 26 is keyed on and movable along the main shaft 13 and rests while in neutral position in the position shown in Fig. 1 to the left of the carrying-wheels 27. When it is desired to set up any figure in the units, tens, hundreds, &c., the operating-wheel is adjusted from the position shown in Fig. 1 to the right one, two, or more steps, as desired. This lateral shifting of the operating-wheel is effected by the frame 92, which has its side bars 93 94 sliding at one end on the main shaft 13 and at their other or rear ends on the guide-shaft 95, which journals in the plates 11 and 12. The frame 92 is thus slidable laterally on the shaft 13, and as it so slides it shifts the operating-wheel from its neutral position to mesh with any desired one of the carrying-disks. The frame 92 is connected with the rack-bar 79 and is shifted to the right from the position shown in Fig. 1 by the lever-pawl operating on said rack-bar, as before described. As best shown in Fig. 6ª, the setting-wheel 26 has a hub or sleeve which extends through the lever 96 and side bar 94 and has fixed upon it outside the bar 94 a collar which operates to retain the parts in proper position. When the operating-wheel is shifted into mesh with the desired one of the carrying-disks 27, it is also meshed with the corresponding one of the intermediate disks, so the action of the operating-wheel in setting up the carrying-disks and accumulating-disks to any desired degree will also set up the printing-wheels through the action of the intermediate disks, as will be understood from Fig. 6. When the operating-wheel is thus set to mesh with any desired ones of the carrying-disks and intermediate disks, if the operating-wheel be moved one point it will set the printing-wheel up one point, and will thus set the said wheel to print "0," as the printing-wheels stand normally at a blank or neutral position, so those printing-wheels which have not been set up will not print at all when the frame 61 is raised to printing position. To remedy this, I provide the zero-setting-up devices, which include a lever 96, pivoted between its ends on the sleeve or hub of the operating-wheel 26, having at its forward end a yielding spring-actuated pawl or point 96ª to engage with the proper intermediate disk 40 and arranged at its rear end for operation by the forward end of a lever 97, which is pivoted at 98 on the shaft 95, and has its rear end sliding on a rod 99, which connects two crank-arms 100, extending from the opposite ends of the shaft 95. The rod 99 operates the lever 97, being moved up and down by the link 101, which connects one of the crank-arms 100 with the crank-arm 102 on the shaft 103, which also has a crank 104, connected by the link 105 with the key-lever 106, by which it is operated. (See Fig. 19.) It will be noticed that the zero-setting-up pawl is in advance or at the right of the operating-wheel when viewed from the rear, as in Fig. 1, so the said pawl is in position to set up the zero of any of the printing-wheels before the operating-wheel is set up to position to operate the said wheel.

It will be understood that I operate the zero-setting-up devices independently of the spring-motor, as the total device is in gear with such motor, and if I employed it for setting up the zero it would add one for every zero so set and would thus affect the column of figures accumulating.

The escapement-releasing mechanism is best illustrated in Figs. 21, 22, and 23. This mechanism includes a wheel 107, which is fixed on the shaft 13 and is composed of a rim 108, having a web 109 and a plate 110. The rim 108 has a series of openings 108ª, parallel to the shaft 13, and radial openings 111 through the inner side of the rim and intersecting the openings 108ª. The plate 110 has radial openings 112, communicating at their outer ends with the openings 111, and this cover-plate 110 fits within the rim 108 and against the web 109, being secured in place by the screws 113. Pins 114 play in the openings 108ª and are provided with grooves 115 and 116, entered by holding-pins 117, which are arranged in the openings or ways 112 and are forced outward into engagement with the pins 114 to hold said pins in either position—that is, entirely within the rim when the pins 117 are engaged in grooves 115 or projecting from the inner face of the rim against the stop-plates 107ª when the pins 117 are engaged in the groove 116, as will be understood from Fig. 23. The openings 108ª in the wheel 107 are arranged a distance apart sufficient when the wheel is moved from one step or from one hole 108ª to the next to move the operating-wheel one step or one tooth. Along the outer side of the wheel 107 I support a guide-plate 118, having holes 118ª in alinement with the holes 108ª and receiving the pins 119, which are also guided in a plate 120 and are actuated normally outward or away from the wheel 107 by the springs 121. Each of the pins 119 is connected with its corresponding disk 122 by a pitman 123, and such disk is connected by a pitman 124 with its operating key-lever 125, so that when such key-lever is depressed it will operate its disk 122 to cause the pitman 123 to force the pin 119 against the pin 114 and force the said pin from the position shown in full lines, Fig. 21, to the position shown in Fig. 23. In this last position the pin 114 will protrude beyond the inner face of the wheel 107 against the plate 107ª and form a stop to abut the end of the escapement-dog 126 and limit the movement of the main shaft at each operation of one of the adding key-levers 125. Each pin 119 is provided between the plates 118 and 120 with an annular groove, in which operates the outer end of a lever 127, which is pivoted at 128 and has its inner end arranged to abut the inner end of a collar 129, which is slidable on the main shaft 13 and is pressed normally in the direction indicated by the arrow 130, Fig. 21, by the spring 131. A lever 132 is pivoted between its ends to the plate 120 and operates at its inner end in a groove 129ᵃ in the collar 129. At its outer end the lever 132 is connected by a rod 133 with the dog 126 and tends to operate the said dog 126 in both directions—that is to say, into and out of the path of the ends of the pins 114, which are protruded from the inner face of wheel 107 by the action of the pins 119, as before described. A spring 134 also engages the dog 126 and tends to force the same outward into the path of the protruded ends of the pins 114. In the operation of this construction as one of the key-levers 125, which are numbered "1" to "9," inclusive, is operated, it will push out its corresponding pin 119, which in turn will force its pin 114 to protrude beyond the inner face of the wheel 107 and into the path of the escapement-dog. Such movement of the pin 119 will cause its lever 127 to operate through the collar 129 and lever 132 to move the dog back clear of the preceding pin 114. All this time the pin 119 extends partly within the opening 108ᵃ in the wheel 107, detaining said wheel. Now if the key-lever be released and the pin 119 be withdrawn the wheel 107 and the main shaft will be moved by its spring-drum until the projected pin 114 strikes upon the escapement-dog, the distance varying according to the key struck, the "1" key moving the main shaft one step, the "2" key moving it two steps, &c. This is regulated according to the distance the pin 119 corresponding to such key stands from the escapement-dog. After the pin 114 has passed below the upper end of the dog 126 the outward movement of said dog will operate to force the pin 114 back to the normal position shown in Fig. 21. If for any reason the pin is not so readjusted by the dog 126, a cam-surface 126ᵃ, arranged in the path of said projecting pin 114, will operate to force the said pin positively back to its normal position.

From the foregoing description it will be seen that I provide means for moving the operating-wheel to set it into mesh with any one of the carrying and intermediate disks, and the said wheel can then be operated by the step-by-step mechanism to advance such disks to set up any desired number on the accumulating-disks and on the printing-wheels. It will also be remembered that prior to setting the operating-wheel into mesh with one of the intermediate disks it is desired to operate the zero-setting-up device will be operated to move the printing-wheel corresponding to such disk up to "0."

The rack 79 is operated by the lever-pawl 80 to move the operating-wheel into engagement with the several disks, units, tens, hundreds, &c. Thus if it be desired to print, for instance, the number "124," the zero-setting-up device will first be operated to move the units-printing wheel up to "0." The operating-wheel is thus brought into mesh with the units-carrying and intermediate disks by means of the rack 79 and pawl-lever 80 and coöperating parts and the "4" key-lever is operated to permit the escapement mechanism to move up four steps, thus moving the main shaft and the operating-wheel four steps, so the units-accummulating disk and the units-printing wheel will be moved up four points. For the next figure ("2") the zero-setting-up device will be operated upon the tens-wheel and the operating-wheel then set up to mesh with the tens-carrying and intermediate disks and then operated to move such disks up two points. The "1" will likewise be set up on the hundreds-disks, completing the number "124." At this time the operating-wheel stands in mesh with the hundreds-disks of the sets of carrying and intermediate disks, being held in such position by the engagement of the spring-actuated point 78 of the detent with the rack-bar 79. As the printing-frame is swung up to print the "124" on the paper the portion 77 will move out from under the lever 75, when the spring 76 will operate said lever 75 to lift the detent-pawl 74 out of engagement with the rack-bar 79, so the said bar will be returned by the spring 135 operating the crank-arm 136, whose wrist-pin 137 bears against the frame 92 and tends to return said frame and the operating-wheel and zero-setting-up device to the starting position, as shown in Fig. 1. If now another number—say, "412"—be printed in the manner before described, it will be understood from the previous description that the total of "124" and "412" will be set up on the accummulating-disks, the units one of such disks being moved six points, the tens-disk three points, and the hundreds-disk five points from the stop and guide-bar 47. To print the total, the eccentric 38 is operated to lower the rear end of the frame 32, so the carrying-disks will be brought directly into mesh with the intermediate disks. This adjustment of the frame 32 to bring the carrying and intermediate disks into mesh with each other also adjusts the gear 58 into mesh with the gear 59, which is also meshed with the gear 18 of the main shaft. If now the "9" key-lever be depressed, the shaft 13 will be released and will, through the gears 18, 59, and 58, operate the total-transferring bar to move the pins 43 back to the stop-bar and so transfer the total to the printing-wheels, which may be operated to print the same upon the paper carried by the paper-carrier.

In the described operation it will be noticed the printing-frame 61 swings into the basket 138 of the type-writer, prints in alinement with the type 139 thereof upon the paper carried by the paper-carrier 64, and coöperates with the type-bars 141, forming a part of the printing devices of the type-writer. By this means the apparatus may be conveniently used for ordinary type-writing, for ordinary addition and striking totals, for stating sums for adding and the total of same, and for stating accounts, including text and figures, as may be desired.

Having thus described my invention, what I claim as new, and desire to secure by Letters Patent, is—

1. An apparatus comprising a type-writing mechanism capable of printing any desired words, and an adding mechanism having printing devices arranged in such relation to those of the type-writer that the printing devices of the adding mechanism may be operated to produce, in connection with those of the typewriter, a joint result upon the same sheet of paper.

2. In an apparatus substantially as described, the combination with the paper-carrier of a type-writer, of an adding mechanism having printing devices arranged in such relation to the paper-carrier as to print upon the paper carried by said carrier, said adding mechanism being operable by the operator independently of the type-writing devices.

3. In an apparatus substantially as described, the combination of a type-writer having a basket and type-bars ranging around the same, and an adding mechanism having printing devices including a pivoted frame swinging into said basket and arranged to cooperate with the type-bars of the type-writer.

4. The combination with a type-writer frame and a basket therein, of a calculating mechanism, the frame therefor arranged approximately radial to the basket of the type-writer frame, and the printing-frame swinging in the calculator-frame radially into the basket of the type-writer.

5. An apparatus substantially as described comprising a type-writing mechanism having its type-bars arranged to operate to a common center, and a calculating mechanism having its printing devices movable in printing position to said center whereby the printing devices of the calculating mechanism may co-operate with the type-bars of the type-writer.

6. In an apparatus substantially as described, the combination of the paper-carrier, the calculating mechanism the printing-wheels movable together and bodily to and from the paper-carrier such wheels being numbered from zero upward and having a blank space adjacent to the zero-mark and a zero-setting-up device.

7. In an apparatus substantially as described, the combination of the printing devices of the type-writer, and the adding mechanism having its printing devices arranged to print in alinement with the printing devices of the type-writer, said adding mechanism being operable by the operator independently of the type-writing devices.

8. In an apparatus substantially as described, the combination of the operating-wheel, the carrying-disks, the accumulating-disks, the printing-wheels, the intermediate disks, and a movable support for the carrying-disks so the latter may be set to position to mesh with the operating-wheel and with the intermediate disks whereby the intermediate disks may be utilized to transfer the figures to be added from the operating-wheel, or the total from the accumulating-disks to the printing-wheels.

9. In an apparatus substantially as described, the combination with accumulating-disks, of mechanism by which to move the said disks in one direction to accumulate the total devices by which to move said disks in the opposite direction whereby to transfer the total, a stop common to all said disks for limiting the total-transferring movement and the total-indicating devices arranged for operation by said total-transferring devices.

10. In an apparatus substantially as described, the combination of the carrying-disks, the accumulating-disks, the printing-wheels, and devices whereby the sums for addition may be transferred directly from the carrying-disks to the accumulating-disks and the sum-total may be transferred from the accumulating-disks through the carrying-disks to the printing-wheels.

11. In an apparatus substantially as described, the combination of the movable operating-wheels, the carrying-disks, the accumulating-disks, the printing-wheels, the intermediate disks arranged for operating by the operating-wheel, and means whereby the carrying-disks may be set into mesh with the intermediate disks.

12. In an apparatus substantially as described, the combination of the operating-wheels, the carrying-disks, the accumulating-disks, meshed therewith, the printing-wheels, means by which the printing-wheels may be operated from the operating-wheel and devices by which the total may be transferred from the accumulating-disks to the printing-wheels.

13. The combination in an apparatus substantially as described of the carrying-disks, the accumulating-disks arranged for operation by the carrying-disks, the printing-wheels, and mechanism whereby the total may be transferred from the accumulating-disks through the carrying-disks to the printing-wheels.

14. The combination in an apparatus substantially as described of the carrying-disks, the accumulating-disks arranged for operation by the carrying-disks, the printing-wheels, the intermediate disks, the operating-wheel meshing, when set for addition, with the carrying-disks and with the intermediate disks, means for moving the accumulating-disks for transferring the total in a direction reverse that in which they are moved for accumulating, and means whereby the carrying-disks are meshed with the intermediate disks in transferring the total.

15. An apparatus substantially as described comprising printing-wheels, arranged to print the sums to be added and the totals, the carrying-disks, the accumulating-disks arranged for operation by the carrying-disks, and mechanism by which the accumulating-disks may be operated to transfer the totals to the printing-wheels.

16. An apparatus substantially as described comprising the carrying-disks, arranged side by side and the operating-wheel shiftable laterally into mesh with any desired one of said disks, the lever for shifting said wheel and the spring for returning the wheel.

17. An apparatus substantially as described comprising the carrying-disks, the printing-wheels, the intermediate disks meshed with the printing-wheels and the operating-wheel shiftable laterally whereby it may be set to mesh with any desired ones of the carrying and intermediate disks.

18. In an apparatus substantially as described, the combination of the printing-wheels, the intermediate disk meshed therewith, and the zero-setting-up device comprising a lever pivoted between its ends and having a pawl-like point engaging the intermediate disks, and means for operating the said lever.

19. In an apparatus substantially as described, the combination of the printing-wheels, the intermediate disks, the zero-setting device engaging said disks, the operating-wheel, a frame supporting said operating-wheel and zero-setting-up device, guides on which said frame is movable laterally and means for operating the zero-setting-up devices, and the operating-wheel.

20. The combination of the printing-wheels side by side, and the zero-setting device movable laterally whereby it may be brought into position to operate any desired one of the printing-wheels.

21. The combination of the printing-wheels, the intermediate disks, the main shaft, the operating-wheel shiftable laterally along said shaft, the frame for shifting said operating-wheel, such frame being also shiftable along the main shaft, a shaft 95 also forming a guide for said frame, crank-arms on said shaft 95, a rod 99 connecting said crank-arms, the zero-setting-up devices including lever 96 and a lever 97, the latter being slidable along and arranged for operation by the rod 99, and operating devices for moving the rod 99 up and down.

22. In an apparatus substantially as described, the combination of the operating-wheel, the zero-setting-up device, the frame carrying said wheel and shiftable laterally and the means for shifting said frame laterally including a rack-bar connected with the said frame and movable longitudinally to adjust the said frame and means for operating the rack-bar.

23. In an apparatus substantially as described, the combination of the laterally-shiftable operating-wheel, and the zero-setting-up device arranged in advance of the operating-wheel, and the disks with which such operating-wheel and zero-setting-up device coöperate.

24. In an apparatus substantially as described, the combination with the laterally-shiftable operating-wheel and the disks which it operates, of the zero-setting-up device movable laterally with the operating-wheel and arranged to operate the disks in advance of their operation by the wheel.

25. The combination of the printing-wheels, the operating-wheel, the zero-setting-up device, means for operating said device and mechanism for operating the operating-wheel, such mechanism being arranged to operate independently of the means for operating the zero-setting devices.

26. An apparatus substantially as described having an operating-wheel, and a zero-setting-up device arranged for operation independently of said wheel.

27. In an apparatus substantially as described, the combination of the framing the operating-wheel, the printing-wheels, the intermediate disks meshed with the printing-wheels and arranged for operation by the operating-wheel, the carrying-disks arranged for operation by the operating-wheel and movable into position to mesh directly with the intermediate disks the accumulating-disks, and means for operating said accumulating-disks for setting the total therefrom onto the printing-wheels.

28. In an apparatus substantially as described, the combination of the operating-wheel, the printing-wheel, the intermediate disks, a pivoted frame, and the carrying-disks and accumulating-disks mounted in said printing-frame.

29. The combination of disks 41, laterally-movable pins 43 carried thereby and projecting at their ends beyond said disks, total-carrying devices engaging said projecting ends of the pins, and means for moving such pins laterally to engage the next disk and transfer from one disk to that of the next higher order.

30. The combination of the accumulating-disks, the pins carried thereby movable laterally at their outer ends and having at such ends heads arranged to engage the next disk when the pins are so moved laterally, and means outside the circumferences of said disks for setting the outer ends of the pins laterally.

31. The combination of the accumulating-disks, the pins pivoted at their inner ends to the disks projecting at their outer ends beyond the same and having at such outer ends head-like portions arranged when the pins are properly set to engage the next disk, and the guide-bar having slots for the passage of the outer ends of said pins, the walls of such slots being sloped or inclined at one side whereby to set the outer ends of the pins laterally.

32. The combination of the accumulating-disks, means for advancing said disks, a total-transferring device for turning said disks reversely to their advancing movement, the printing-wheels, means whereby the printing-wheels and accumulating-disks may be geared together during the transferring movement of said disks whereby the printing-wheels may be turned to the desired printing position, and means for automatically turning the printing-wheels to return them to their initial positions.

33. The combination of the accumulating-disks, having the projecting pins and a total-carrying bar movable across said disks and arranged to move the pins back to starting-point, said total-carrying bar being rockable so it can be set out of the path of the disk-pins except when it is desired to transfer the total and means for so rocking the total-carrying bar.

34. The combination of the accumulating-disks having projecting pins, the total-carrying bar arranged to engage said disks, the arms to which said total-carrying bar is pivoted and tripping devices for tilting said bar out of the path of the pins except when it is desired to transfer the total.

35. The combination of the accumulating-disks, the total-carrying bar swinging over the said disks, the arms to which said bar is pivoted, a rocking adjusting device connected with the total-carrying bar and a stop or abutment for engagement by said adjusting device whereby to operate the same to tilt the total-carrying bar.

36. The combination of the accumulating-disks having projecting laterally-movable pins, the guide-bar at one side of the disks and provided with slots forming passages for the pins and having inclined or sloped walls whereby to actuate the said pins, such bar being arranged to form a stop for the pins in transferring the total and the total-transferring bar swinging over the disks toward and from the guide-bar.

37. In an apparatus substantially as described, the combination of the accumulating-disks, the total-transferring bar and the bar forming a stop for the disks in transferring the total such bar being depressible and spring-returned.

38. In an apparatus substantially as described, the combination of the accumulating-disks, the total-carrying bar, the arms supporting said bar, the pinions connected with said arms, the yielding spring-returned stop-bar, the shaft having the pinions meshing with those of the said arms and an adjustable stop whereby to limit the movement of such shaft whereby to regulate the distance to which the stop-bar will be depressed by the pressure of the total-transferring bar.

39. The combination of the carrying and accumulating disks, the total-transferring mechanism, a gear for operating the total-transferring mechanism, the printing-wheel, the intermediate disks, the movable frame supporting the carrying-disks, the accumulating-disks and the gear for operating the total-transferring mechanism, and gearing whereby the said operating-gear may be driven from the main shaft when the parts are adjusted to position to transfer the total to the printing-wheels.

40. The combination of the accumulating-disks, having the projecting laterally-movable pins arranged to be set into engagement with the next disk, the total-transferring devices and the combined guide and stop bar yieldingly supported and having slots, and inclined surfaces for engagement by said pins and a spring for returning the said stop and guide bar.

41. The combination of the operating-wheel, the rack for advancing said wheel and the detent for holding said rack as it is adjusted to advance the operating-wheel, the swinging printing-frame and mechanism whereby the rack-detent is released when the printing-frame is moved to printing position.

42. The combination of the operating-wheel, the rack for advancing the same, means for operating said rack, the detent engaging said rack the lever supporting said detent, a spring by which said lever is set in one direction and the printing-frame arranged when in normal position to hold said lever against the action of its spring and when moved to printing position to release said lever.

43. The combination of the operating-wheel, the rack-bar for advancing said wheel, the pawl-lever and its operating devices for adjusting such rack-bar lengthwise, the detent-pawl, having a yielding or spring point engaging the rack, the lever supporting the detent at one end, the printing-frame swinging into and out of engagement with the other end of the lever and the spring for actuating said lever in opposition to the printing-frame.

44. The combination of the carrying-disks, the accumulating-disks, the total-transferring devices including a gear-wheel, the frame 32 carrying said disks and total-transferring devices and gear-wheel, and movably supported whereby it can adjust the gear-wheel into and out of mesh with its driver and means for moving the frame 32.

45. The combination with the frame 32 movably supported, the total-transferring devices, the carrying-disks, the accumulating-disks, and the gear carried by said movable frame, of the drive-gear with which said gear may be caused to mesh in one position of the frame 32, and the shaft 33 having cranks 34 and 36, the pitman 35, the lever 37, the spring 39 and the eccentric 38, for operating the frame 32.

46. The combination with the total-indicating devices the accumulating-disks and the total-transferring bar movable in one direction to transfer the total to the total-indicating devices, of means for operating said bar to transfer the total, and a spring for returning said bar to the starting-point.

47. In an apparatus substantially as described, the combination of the printing-wheels, arranged when at rest to present a blank to the printing-line and a zero-setting-up device by which to set up the zeros of said disks to bring the same to position for operation by the operating-wheel.

48. In an apparatus substantially as described, the combination of the printing-wheels having blank spaces next to their zeros, mechanism for operating said wheels and a zero-setting-up device arranged for operation independently of the mechanism for operating the printing-wheel whereby the said wheels may be set up to zero when it is desired to operate the said wheels.

49. In an apparatus substantially as described, the combination of the printing-wheels, the intermediate disks, and the zero-setting-up device arranged to act upon the intermediate disks whereby to set up the zeros on the printing-wheels.

50. In an apparatus substantially as described, the combination of the printing-wheels, a swinging frame supporting the same, springs acting on the printing-wheels by which to return the same to their initial positions, detents for holding said wheels in any desired adjustment against the tension of their springs and means for automatically releasing said detents on the return movement of the printing-frame.

51. In an apparatus substantially as described, the combination of the printing-wheels, the swinging frame supporting the same, the springs for readjusting the wheels to their initial positions, the detent-pawls for securing said wheels in any desired adjustment, a shaft carried by the swinging frame and having a blade-like portion arranged for operation to free the detents and means for operating said shaft on the return movement of the swinging frame.

52. The combination of the swinging printing-frame, having the printing-wheels, the detent-pawls therefor, the shaft carried by said frame and having a lug or blade arranged to release the pawls when the shaft is turned in one direction, and an abutment on the main frame arranged to turn the shaft in such direction on the return movement of the printing-frame.

53. The combination of the printing-wheels, a swinging frame supporting the same, means for returning said wheels to initial position, detents for said wheels and devices operated by the return movement of the swinging frame by which to release the detents.

54. The combination of the printing-wheels, the printing-frame swinging into and out of printing position, the operating-wheel, the rack for shifting said wheel laterally, means for operating said rack, the detent for said rack, the lever 75 connected with said detent and arranged to be set in one direction by the printing-frame, and the spring acting on said lever to throw the detent clear of the rack for setting the operating-wheel.

55. In an apparatus substantially as described, the combination of the main shaft, the spring for operating the same, the movable printing-frame and means whereby the movements of the printing-frame may operate to rewind the said spring.

56. The combination of the main shaft, the driving spring-shaft geared with the main shaft, the pulley 20 on the spring-shaft, the shaft 24 having a segment 23 connected with the pulley 20, the swinging printing-frame and the connecting-link 55.

57. The combination of the main shaft, the carrying-disks, the accumulating-disks, the printing-wheels the intermediate disks, the movable frame supporting the accumulating-disks, the total-transferring devices including a gear-wheel carried by said movable supporting-frame, intermediate gearing between said gear-wheel and the main shaft whereby to drive the total-transferring devices when the supporting-frame is set to position to transfer the total, and the operating-wheel supported on the main shaft and movable to neutral position when the parts are in position to transfer the total.

58. The combination of the main shaft, the operating-wheel thereon, the series of disks for operation by the operating-wheel, mechanism for shifting the operating-wheel, and the movable printing-frame and coöperating devices whereby to secure the automatic return of the operating-wheel to neutral position as the printing-frame is moved.

59. The combination of the main shaft the operating-wheel and zero-setting-up device shiftable along said shaft, a frame in which said wheel and device are held and shifted back and forth along the main shaft, mechanism for advancing said frame, a spring for returning it, detent devices for securing the frame as it is advanced, and means for freeing such detent devices to permit the return of the frame.

60. The combination of the accumulating-disks, pins pivoted thereto and projecting at their outer ends beyond said disks and movable laterally at such ends whereby they may be set into engagement with the adjacent disks, means engaging the projecting ends of the pins whereby to set them laterally into engagement with the adjacent disk, and the total-carrying bar movable across said disks and arranged to engage said pins in transferring the totals.

61. The combination of the printing-wheels numbered ranging from zero upward and having blank spaces adjacent to the zeros, combined with means whereby the said wheels may be turned in one direction to the desired printing adjustment, and means by which to automatically turn said wheels in the opposite direction back to their initial position.

62. In an apparatus substantially as described the combination of the printing-wheels numbered from zero upward and having blank spaces next their zeros, the operating-wheel arranged to operate said printing-wheels and a zero-setting-up device arranged in advance of the operating-wheel whereby it can be operated to set up the zero of any wheel in advance of the operation of said wheel through the operating-wheel.

63. In an apparatus substantially as described a printing-wheel numbered ranging from zero upward with the unit following the zero and having a blank space adjacent to the zero-point and on the opposite side thereof from the unit whereby the disk will present a blank to the printing-line when in initial position.

64. In an apparatus substantially as described, the printing-wheels numbered ranging from zero upward and having blank spaces adjacent to the zeros combined with means by which to return the wheels to initial position, and devices for stopping the wheels in initial position.

65. In an apparatus substantially as described, the printing-wheels numbered from zero upward and having blank spaces next their zeros combined with springs for returning said wheels to position to present the blank spaces to the printing position, devices for stopping the wheels in such position and stops for limiting the advance movements of said wheels.

66. In an apparatus substantially as described, the combination of the main shaft, means for impelling such shaft in one direction, the detent-wheel on said shaft and provided with pins arranged to be protruded, key-operated mechanism by which to protrude said pins, a stop for abutment by said pins and means for automatically retracting said pins.

67. In an apparatus substantially as described, the combination of the calculating mechanism including a total-transferring mechanism having a gear-wheel, a movable support for such gear-wheel whereby it may be moved to gear with the main shaft, the main shaft operatively impelled in one direction and step-by-step mechanism controlling the movement of the said shaft.

68. In an apparatus substantially as described, the combination of the calculating mechanism, a total-transferring device, the main shaft, means whereby said main shaft may operate the calculating mechanism, and means whereby said shaft may be caused to operate the total-transferring device.

69. In an apparatus substantially as described, the combination of a main shaft operatively impelled in one direction, mechanism for controlling said shaft, and the total-transferring device having a gear which is movable into and out of operative connection with the main shaft whereby the movement of the latter may transfer the total.

70. The combination in an apparatus substantially as described, of the main shaft, the spring for impelling such shaft in one direction, the movable printing-frame means whereby the movements of the printing-frame rewind the shaft-spring and step-by-step mechanism controlling the movement of such shaft by its spring.

71. The combination of the main shaft the spring for impelling the shaft in one direction, the step-by-step mechanism for controlling the movements of the shaft, the operating-wheel on said shaft, the calculating mechanism arranged for operation by said wheel, the total-transferring device and means whereby the main shaft may operate said total-transferring device.

72. In an apparatus substantially as described the combination of the main shaft forcibly impelled in one direction, the detent-wheel on said shaft, pins carried by said shaft and arranged to be protruded, means for protruding said pins, a movable stop or dog in the path of the protruded pins and means for effecting the movements of said stop or dog.

73. In an apparatus substantially as described, the combination of the main shaft, a wheel on said shaft pins movable in said wheel to protrude, and a dog in the path of said pins when the latter are protruded.

74. In an apparatus substantially as described, the combination of the main shaft, the wheel on said shaft, pins movable in said wheel to protrude, a dog in the path of said pins when protruded, mechanism for protruding such pins and devices between said pin-protruding mechanism and the dog whereby to properly adjust the dog out of the path of the protruded pin.

75. In an apparatus substantially as described, the combination of the main shaft, the wheel thereon having stop-pins and openings in which said pins are movable longitudinally whereby they may be protruded, operating-rods for protruding said stop-pins, such operating-rods being movable in such operation into the opening in the wheel, the dog, and intermediate devices between the dog and the operating-rods whereby the movement of said pins may set the dog into and out of the path of the stop-pins.

76. In an apparatus substantially as described, the combination of the calculating devices, the main shaft arranged to operate the same, the detent-wheel on said shaft having stop-pins, arranged to be projected, an escapement-dog movable into and out of the path of the projected pins, the operating-rods for projecting said pins, the journaled disks or wheels connected with said rods to operate the same and the key-levers for operating said disks or wheels.

77. The combination in an apparatus substantially as described of the main shaft, a spring for impelling such shaft in one direction, a detent-wheel fixed on said shaft and having openings for stop-pins, stop-pins movable in said openings and arranged to be projected, an escapement-dog in the path of the stop-pins, the operating-rods for operating said pins, levers arranged for operation by said rods, a collar on the main shaft arranged for operation by said levers and a lever and connecting devices between said collar and the escapement-dog.

78. The combination of the spring-impelled main shaft the calculating devices arranged for operation by said shaft, the detent-wheel on the main shaft and having pins arranged to be projected, means for projecting said pins, the detent-dog arranged in the path of the projected pins and a cam 126$^a$ by which to positively return the said projected pins.

79. The combination of the main shaft, the detent-wheel having pins arranged to be protruded, an escapement-dog in the path of the stop-pin, a collar on the main shaft means for sliding said collar along the shaft and intermediate devices between the collar and the escapement-dog substantially as set forth.

80. An apparatus, comprising a type-writing mechanism capable of printing the text, and an adding mechanism having printing devices and totalizing devices, and having its printing devices arranged to print the sums for addition and the total thereof the type-writing and adding mechanisms being so supported relatively as to produce a joint result upon the same sheet of paper, substantially as set forth.

81. An apparatus, substantially as described, comprising a type-writing mechanism having operating-keys and printing devices, and an adding mechanism having printing devices arranged in such relation to those of the type-writer that they may be operated to produce, in connection with the said printing devices of the type-writer, a joint result upon the same sheet of paper, and keys for operating the adding mechanism.

FREDERICK H. SANDHERR.

Witnesses:
F. H. HUNICHE,
C. S. CHARLOT,
W. B. WATSON.